United States Patent
Bass et al.

(10) Patent No.: US 8,587,233 B2
(45) Date of Patent: Nov. 19, 2013

(54) SPEED-DEFINED TORQUE CONTROL

(75) Inventors: Jordan Bass, Phoenix, AZ (US); Louis Sulfstede, Irving, TX (US)

(73) Assignee: SNTech, Inc., Phoenix, AZ (US)

(*) Notice: Subject to any disclaimer, the term of this patent is extended or adjusted under 35 U.S.C. 154(b) by 482 days.

(21) Appl. No.: 13/012,647

(22) Filed: Jan. 24, 2011

(65) Prior Publication Data

US 2011/0181216 A1 Jul. 28, 2011

Related U.S. Application Data

(60) Provisional application No. 61/298,131, filed on Jan. 25, 2010.

(51) Int. Cl.
*H02P 6/04* (2006.01)

(52) U.S. Cl.
USPC ............ 318/400.11; 318/400.01; 318/400.12; 318/400.15

(58) Field of Classification Search
USPC ............ 318/400.11, 400.01, 400.07, 400.12, 318/400.15
See application file for complete search history.

(56) References Cited

U.S. PATENT DOCUMENTS

| | | | |
|---|---|---|---|
| 4,982,147 A * | 1/1991 | Lauw | 318/729 |
| 5,325,036 A * | 6/1994 | Diethert et al. | 318/802 |
| 5,818,194 A | 10/1998 | Nordby | |
| 5,880,416 A | 3/1999 | Colby et al. | |
| 6,046,554 A * | 4/2000 | Becerra | 318/400.34 |
| 6,571,599 B1 | 6/2003 | Surjadi et al. | |
| 7,755,310 B2 * | 7/2010 | West et al. | 318/400.02 |
| 7,975,498 B2 | 7/2011 | Shah et al. | |
| 8,106,618 B2 * | 1/2012 | Fabis et al. | 318/661 |
| 8,362,732 B2 * | 1/2013 | Anwar et al. | 318/490 |

FOREIGN PATENT DOCUMENTS

| | | |
|---|---|---|
| JP | 06-261594 A | 9/1994 |
| JP | 06-338427 A | 12/1994 |
| JP | 11-018480 A | 1/1999 |
| JP | 11-215709 A | 8/1999 |
| JP | 11-252964 A | 9/1999 |
| JP | 2004-247834 A | 9/2004 |
| JP | 2005-110344 A | 4/2005 |

OTHER PUBLICATIONS

International Search Report for PCT/US2011/022433, mailed Sep. 14, 2011.

* cited by examiner

*Primary Examiner* — Bentsu Ro
*Assistant Examiner* — Thai Dinh
(74) *Attorney, Agent, or Firm* — Knobbe, Martens, Olson & Bear LLP

(57) ABSTRACT

Motors, such as DC motors, and methods and systems for operating a motor, are described. The motor is optionally an electronically commutated motor. The motor comprises one or more electromagnets and a controller device to control the electromagnets. The controller device is configured to calibrate the motor operation in a desired installation to determine the torque needed to achieve a desired operating speed by causing the motor to ramp up to the desired speed, measuring an electric current needed to operate the motor at the desired speed, and setting a value corresponding to a first speed tap using the measured electric current. The controller device is configured to operate the motor in a substantially constant torque mode using the set value at least after the completion of the calibration operation. The motor may be configured for use in a ventilation system, such as an HVACR system.

28 Claims, 5 Drawing Sheets

SPEED-DEFINED TORQUE CONTROL

CROSS-REFERENCE TO RELATED APPLICATIONS

This application claims the benefit under 35 U.S.C. 119(e) of U.S. Provisional Application No. 61/298,131, filed Jan. 25, 2010, the contents of which are incorporated herein in its entirety.

BACKGROUND OF THE INVENTION

1. Field of the Invention

The present invention relates to motor control, and in particular, to methods and systems for electronically controlling motors.

2. Description of the Related Art

HVACR (Heating, Ventilating, Air Conditioning, and Refrigeration) manufacturers conventionally design and manufacture multiple sizes of a given air conditioning, heat pump, furnace platform or other HVACR platform to accommodate different size spaces, buildings, installations, capacities, and different airflows. For example, a manufacturer may provide a variety of equipment sizes. For air conditioning the equipment may have ratings such as 1 ton, 2 ton, 3 ton, 4 ton, 5 ton, etc. For furnaces or heat pumps operating in the heating mode, the equipment may be rated in BTU, indicating the value of their heating output, such as 60,000 BTU 80,000 BTU, 100,000 BTU, etc. Different sizes of equipment generally require different size blower motors. The motors may be rated in horsepower, such as ¼ HP, ⅓ HP, ½ HP, ¾ HP, 1 HP, 1.5 HP, 2 HP, etc. However, each manufacturer may use a somewhat different blower. Further, for the same equipment rated output and given horsepower rating, some manufacturer's blowers may use or provide 100% of the rated horsepower capacity of the motor, some may use or provide 90% of the rated capacity, and some may even use 80% of the motor's rated capacity. Thus, the manufacturer's horsepower rating may not be a reliable indication of the actual horsepower needed in a replacement motor.

Further, HVACR manufacturers often design products for a specific static pressure (rated static pressure) and a specific RPM (Revolutions per Minute) in part by selecting a motor with the horsepower needed to produce the desired RPM at the static pressure used to rate their equipment. In general, the motor has been optimized for operation at that "rating" static pressure. However, when the HVACR equipment is installed in a home or commercial building, the static pressure is often different than that rated static pressure. For example, the actual static pressure may be significantly higher or lower than the rated static pressure the manufacturer's product was tested at to establish the equipment's rating. As the static load changes, a conventional motor may be operated at an RPM different than its optimal design point. This typically means the manufacturer must use motors with different horsepower ratings in order to accommodate even a relatively narrow range of different static pressures and one motor of any size may not be operating in an optimum condition in an application.

In view of the foregoing, distributors and manufacturers must carry inventory of a number of different motors at different horsepower ratings to ensure they are available when a demand arises. Moreover, because a contractor may not know what horsepower motor is actually needed to replace an existing motor, a contractor servicing HVACR equipment will typically need to carry an inventory of various motors to job sites to accommodate different loads, even when those loads do not vary widely. Failure to carry the needed motor results in wasted time as the contractor will have to leave the job site to purchase the proper motor. It should be noted that even replacing the installed motor with one of the same size may not produce proper operation, particularly in some severely restricted, high static pressure applications.

SUMMARY OF THE INVENTION

Certain example embodiments provide a motor that automatically adjusts its horsepower and/or torque for a given application, such as a specific HVACR blower installation. Thus, certain embodiments enable a single motor-type to be used to replace a plurality motor-types covering a range of horsepower.

An example embodiment includes a motor, such as an electronically commutated motor, comprising: one or more electromagnets; and a controller device to control the electromagnets, the controller device configured to calibrate operation of the motor in a desired installation by: causing the motor to ramp up to a first desired speed; monitoring the motor to determine if it has reached the first desired speed; measuring an electric current needed to operate the motor at the first desired speed, wherein the electric current corresponds to a torque needed to maintain the motor at the first desired speed in the desired installation; and setting a value corresponding to a first speed tap using the measured electric current, wherein the controller device is configured to operate the motor in a substantially constant torque mode using the set value at least after the completion of the calibration operation.

The foregoing motor may optionally be operated in a constant speed mode when the electric current needed to operate the motor at the first desired speed is measured, wherein the controller device is configured to subsequently operate the motor in the constant torque mode using the set value. Optionally, the first speed tap is the only speed tap of the motor to which power is applied during the calibration operation, and the controller device is optionally further configured to set a value for a second speed tap as a percentage of an application rated torque associated with the first speed tap. Optionally, the motor has a rated maximum horsepower and in certain circumstances, the controller device is configured to operate the motor at less than the rated maximum horsepower based at least in part on the measured electric current. Optionally, the motor has a rated maximum torque and the controller device is configured to operate the motor at less than the rated maximum torque in certain circumstances based at least in part on the measured electric current. Optionally, the controller device is configured to initiate the calibration at least partly in response to a command being received from a thermostat, wherein the motor does not have a separate physical control for initiating calibration. Optionally, the controller device is configured to initiate the calibration by applying power to the first speed tap. Optionally, the motor is configured to be installed in a ventilation system to cause airflow. Optionally, the motor is configured to be a drop-in replacement for a permanent-split capacitor motor.

An example embodiment includes a method of sizing a motor torque, comprising: installing a first motor having a first speed tap; applying power to the first speed tap; causing the first motor to ramp up to a first commanded speed and a calibration process to be initiated, the calibration process comprising: causing sufficient motor torque to be produced to hold the first commanded speed substantially constant for a first period of time; determining a value corresponding to a torque needed to hold the first motor substantially constant at the first commanded speed; storing the value corresponding to the torque needed to hold the first motor substantially constant at the first commanded speed; and operating the first motor in a constant torque mode based upon the stored value.

Optionally, in the foregoing method, the value corresponding to the torque needed to hold the speed substantially constant corresponds to a current used to drive a coil of the first motor when holding the first motor substantially constant at the commanded speed. The method optionally further comprises setting the value as the value for the first speed tap of the first motor; setting a value for a second speed tap of the first motor based at least on the value for the first speed tap, the value for the second speed tap corresponding to a current needed to hold the first motor substantially constant at a second speed. Optionally, the calibration process is initiated in response to a thermostat setting. Optionally, the method further comprises removing a second motor prior to installing the first motor, wherein the first motor is used to replace the second motor, and wherein the first motor is an electronically commutated motor and the second motor is a permanent-split capacitor motor, wherein installing the first motor further comprises connecting all wiring previously connected to terminals of the second motor to the first motor. Optionally, the method further comprises resetting the value by applying a voltage to at least two speed taps of the first motor at the same time. Optionally, the first speed tap is a highest speed tap of the first motor, wherein the first motor includes a plurality of speed taps. Optionally, the first motor is installed in a ventilation system. Optionally, a user takes no manual action with respect to the calibration process during the calibration process.

An example embodiment includes a controller configured to control operation of a motor, the controller comprising: a computing device: non-transitory memory that stores program instructions, that when executed by the computing device are configured to perform operations comprising: calibrating the motor for a given installation by: at least partly causing the motor to operate at a first desired speed; determining a value corresponding to a torque needed to operate the motor at the first desired speed; storing the value corresponding to the torque needed to operate the motor at the first desired speed in association with a first speed tap of the motor; and at least after completion of the calibration, operating the motor in a substantially constant torque mode using the stored value.

Optionally, the controller operations further comprise measuring an electric current corresponding to the torque needed to operate the motor at the first desired speed, wherein the determined value is determined based at least in part on the measured electric current. Optionally, the motor is operated in a constant speed mode when the electric current corresponding to the torque needed to operate the motor at the first desired speed is measured, wherein the controller is configured to subsequently operate the motor in the constant torque mode using the stored value. Optionally, the controller is further configured to set a value for a second speed tap by scaling an application rated torque associated with the first speed tap. Optionally, the motor has a rated maximum horsepower and the controller is configured to operate the motor at or less than the rated maximum horsepower based at least in part on the stored value. Optionally, the motor has a rated maximum torque and the controller is configured to operate the motor at less than the rated maximum torque based at least in part on the stored value. Optionally, the controller is configured to initiate the calibration at least partly in response to a command being received from a thermostat, wherein the motor does not have a separate physical control for initiating calibration. Optionally, the controller is configured to initiate the calibration by applying power to the first speed tap. Optionally, the controller is integral to the motor. Optionally, the motor is an electronically commutated motor.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1A:
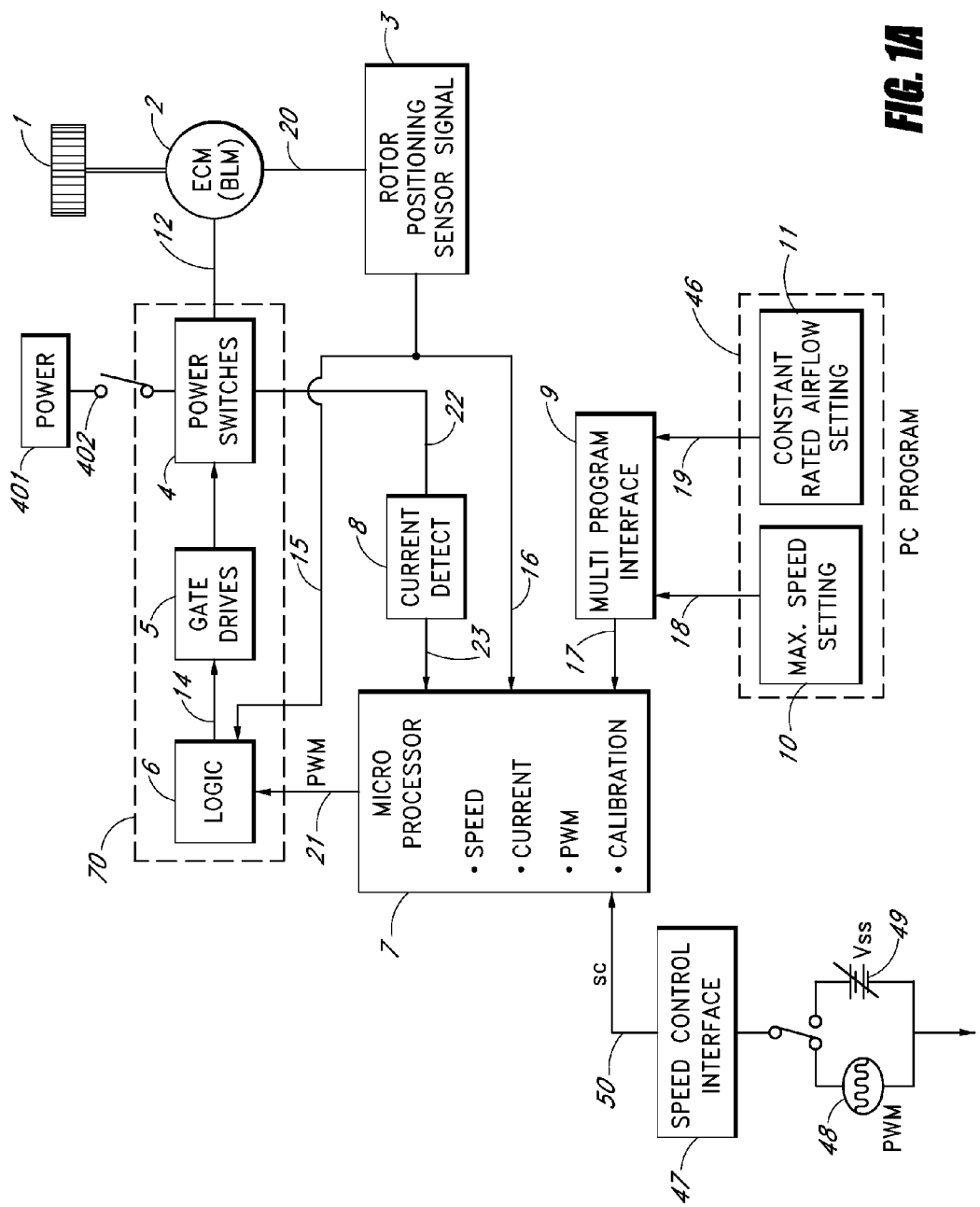
FIG. 1A illustrates a block diagram of an example embodiment.

As discussed above, HVACR manufacturers conventionally manufacture multiple sizes of a given platform to accommodate different size spaces, buildings, installations, capacities, and different airflows. However, each manufacturer may use a somewhat different blower. Further, for a given horsepower rating, some manufacturers may use or provide 100% of the rated horsepower capacity, some may use or provide 90% of the rated capacity, and some may use or provided 80% of the rated capacity. In addition, the motor as installed in the actual application may not be operating at its optimal efficiency since the application can affect the performance of the motor. Therefore, the manufacturer's horsepower rating may not be a reliable indication of the actual horsepower needed in a replacement motor.

Thus, a contractor servicing HVACR equipment often does not know what horsepower motor will be needed when replacing an existing motor because the horsepower rating of the original motor may be inaccurate or because the load may vary from that which was used to establish the original motor's horsepower rating. Therefore, the contractor will typically need to maintain a significant inventory of various motors at job sites to replace existing motors and/or to accommodate different loads. In addition, often an installer does not even know the rating of the original motor prior to arriving at the worksite. Thus, when the installer arrives at the worksite, the installer must first physically inspect the label on the original motor to determine the horsepower rating, and then must go offsite to get a replacement motor with that same horsepower rating.

In addition, conventionally, manufacturers must manufacture motors of various horsepower ratings in order to accommodate different applications and even relatively narrow ranges of different static pressures in an HVACR application. Further, conventionally distributors and manufacturers must likewise carry inventory of a number of different motors at different horsepower ratings to ensure they are available when a demand arises.

These and/or other problems are addressed by a motor, motor controller, and motor control methods, embodiments of which are described herein, that adjusts the motor to provide different amounts of horsepower and/or torque. By way of example and not limitations, certain embodiments may be used to adjust the horsepower of a motor used in a heating, ventilation and air conditioning (HVAC) system, such as to drive a blower or fan, in a pumping system, or any other application where it would be useful for a motor to be sized to a load. Thus, certain embodiments enable a single motor-type to be used to replace a plurality motor-types covering a range of horsepower.

In an example embodiment, a calibration procedure is performed to automatically set the desired horsepower rating for the motor when installed in a system, such as an HVACR system or a pumping system. Certain embodiments include a direct current (DC) motor, such as an ECM (Electronically Commutated Motor) motor (e.g., a programmable brushless DC motor including a permanent magnet rotor and an inverter) or an alternating current (AC) motor, such as a polyphase motor (e.g., a 2 phase or a 3 phase AC motor) with electronic drive and/or permanent magnets, that "sizes" itself for the application in which it is installed. For example, certain embodiments utilize a Speed-Defined Torque Control (SDTC) calibration process, also referred to herein as autosizing, to set the motor horsepower and/or torque needed to provide the desired motor speed(s) for the specific HVACR system in which the motor is operating. An example embodiment of the SDTC calibration process is described below.

In an example embodiment, the ECM motor will automatically size its horsepower based on the torque needed to maintain the rated speed for the motor in particular HVACR installation. For example, in certain embodiments, the motor can size itself for the speed specified for the tap used to calibrate the motor. Certain embodiments of the Speed-Defined Torque Control calibration process automatically scales the motor's torque to the value needed to maintain the rated or desired speed in the system. In many applications, certain embodiments of the calibration process allow contractors to simply replace an existing motor (e.g., a PSC motor) with an Speed-Defined Torque Control motor, such an ECM (or other motor-type) and obtain the same performance or rating and/or with an upgraded performance or rating, with the improved operating characteristics of an ECM, if such is used.

By way of example, in one embodiment, when a ½ HP rated Speed-Defined Torque Control ECM is applied to a ¼ HP system, the motor will automatically size itself to ¼ HP and will consume about the same amount of electricity as an ECM rated at ¼ HP.

By way of further example and not limitation, an embodiment of a motor disclosed herein may be used as a replacement for a plurality of different motor-types having different respective horsepower ratings (e.g., motor-types having respective ratings of ¼ HP, ⅓ HP, ½ HP, ¾ HP, 1 HP, 1.5 HP, 2 HP, 2.5 HP, 3 HP, 3.5 HP, 4 HP rating, 4.5 HP, 5 HP, etc.) or airflow ratings (e.g., 1 ton, 2 ton, 3 ton, etc.).

FIG. 1A is a block diagram of a motor controller system for controlling a brushless motor according to an example embodiment. Other embodiments may include different components, components with different properties and values, and/or different arrangements of components.

In certain embodiments, the motor control system controls the motor operation to thereby adjust the air flow rate in a ventilation system. For example, the controller may be configured to control the motor to generate a substantially constant airflow rate in a ventilation duct over static pressure changes in the duct. Certain embodiments of the controller do not require a static pressure sensor for monitoring the static pressure changes or a feedback control based on a monitored static pressure input, although certain embodiments may utilize such static pressure sensor or feedback control. Certain embodiments of the controller do not require an airflow rate sensor for monitoring the airflow rate changes or a feedback control based on a monitored airflow rate input, although certain embodiments may utilize such airflow rate sensor or feedback control. In some embodiments the controller is embedded in or integral to the motor, and in other embodiments the controller is physically separate from the motor (e.g., not included within the motor housing).

In an example embodiment, the controller or its associated sensor(s) monitors the rotational speed (e.g., RPM) or back-EMF (electromotive force from which rotational speed may be derived or estimated) of the motor and utilizes the monitored speed for the control of the airflow rate. In an example embodiment, the controller and/or its associated sensor(s) monitor the electric current applied to the motor and utilize the monitored electric current to control the airflow rate (e.g., by controlling speed and/or torque). Further, the controller may optionally process the rotational speed input and the electric current input so as to determine the length of time during which the power is turned on (turn-on period) to accomplish a substantially constant airflow. Optionally, the controller controls the airflow rate using intrinsic information of the motor's operation, such as rotational speed and electric current, rather than using extrinsic information such as static pressure and airflow rate, although such extrinsic information may be utilized as well.

The illustrated embodiment includes electronics that switches the DC fields and that controls the torque and speed of the motor (e.g., so that the airflow in an HVACR system is maintained even if the pressure seen by the fan varies). The motor may include multiple taps (e.g., to adjust the flow rates), wherein a given tap is associated with a different flow rate (which may be a rated flow rate). The ECM may be configured to operate at a relatively low speed and then operate at relatively high speed when a thermostat connected to the ECM indicates additional cooling or airflow is desired. This provides for a more efficient motor, which may enable an ECM to operate using substantially less electricity over a given period of time as compared to a conventional PSC motor. The ECM may be coupled to a fan, which blows air in a ventilation duct to generate an airflow with a airflow rate, which when operated in a constant torque mode, may provide less variation in airflow than a motor operated in constant speed mode, even while a static pressure within the duct significantly changes.

In the illustrated embodiment, the motor controller includes an electronic control circuit 70. The electronic control circuit 70 includes a power switch circuit 4, a gate circuit or drives 5 and a logic circuit 6. The power switch circuit 4 has an output connected to a motor 2 via a line 12 and supplies a motor coil with switching power, such as a single-phase, two-phase or three-phase for driving a fan 1. The motor 2 can be an electrically commutated motor (ECM) or a brushless motor (BLM), although not limited thereto. The gate circuit 5 is provided for driving the power switch circuit 4, and a logic circuit 6 is provided for controlling a control signal suitable for controlling the motor.

In the illustrated example embodiment, the motor controller further includes a current detection circuit 8 for detecting a load current 22 flowing through the motor coil, and a rotor position detection processing circuit 3 for processing a pulse of a position detection signal of a motor rotor. The current detection circuit 8 is connected to an input of a microprocessor 7 via a line 23. The rotor position detection processing circuit 3 is connected to the inputs of the microprocessor 7 and the logic circuit 6 via lines 16 and 15, respectively.

In the illustrated example embodiment, the motor controller includes an input device 46, which has a maximum speed setting unit 10 for use in setting a target RPM corresponding to various airflow rates. Further, the input device 46 includes an airflow rate setting unit 11 for setting various levels of substantially constant airflow rates. The maximum speed setting unit 10 and the constant rated airflow setting unit 11 are connected to a multi-program interface circuit 9 via lines 18 and 19, respectively. The multi-program interface circuit 9 has an output connected to the input of the microprocessor 7 via line 17.

The motor controller of the illustrated embodiment further includes an interface circuit 47, a pulse width modulation (PWM) unit 48, and a DC variable voltage unit 49. The interface circuit 47 is configured to process a PWM signal (e.g., at 80 Hz) for speed setting, which may be supplied from an external system or control device through the pulse signal supply unit 48, and a variable DC voltage (e.g., in the range of 0 to 10V, or other range) supplied from the DC variable voltage unit 49 by using a terminal (e.g., a single terminal or multiple terminals). The interface circuit 47 is connected to the input of the microprocessor 7 via line 50.

The microprocessor 7 is configured to process data to control the DC motor so as to optionally operate the motor in a substantially constant airflow rate mode based on the acquired data from the sensor circuits, and transmit a PWM signal (for example, 20 Khz) for speed control. The output signal is transmitted to the logic circuit 6 of the electronic control circuit 70 via a line 21.

Optionally, the controller has a set of commands for performing a self-testing operation and for performing a calibration operation. In the test operation of the ventilation system, when the motor driving power switch 402 turns on, the motor is operated to rotate the fan from a still state to a speed (e.g., a preset maximum speed) as the microprocessor 7 outputs a PWM output signal while being automatically modulated (e.g., from 0 to 100%) according to a self-driving test operation commands of the microprocessor 7. At this time, from the load current 22 and the speed signal 16, the microprocessor 7 acquires current data, speed data, and a peak current rate, which may vary according to various different fan loads and environments, and determines the current-speed relation, which may be stored in memory and/or displayed to an operator. An example embodiment of the calibration operation will be discussed below.

Figure 1B:
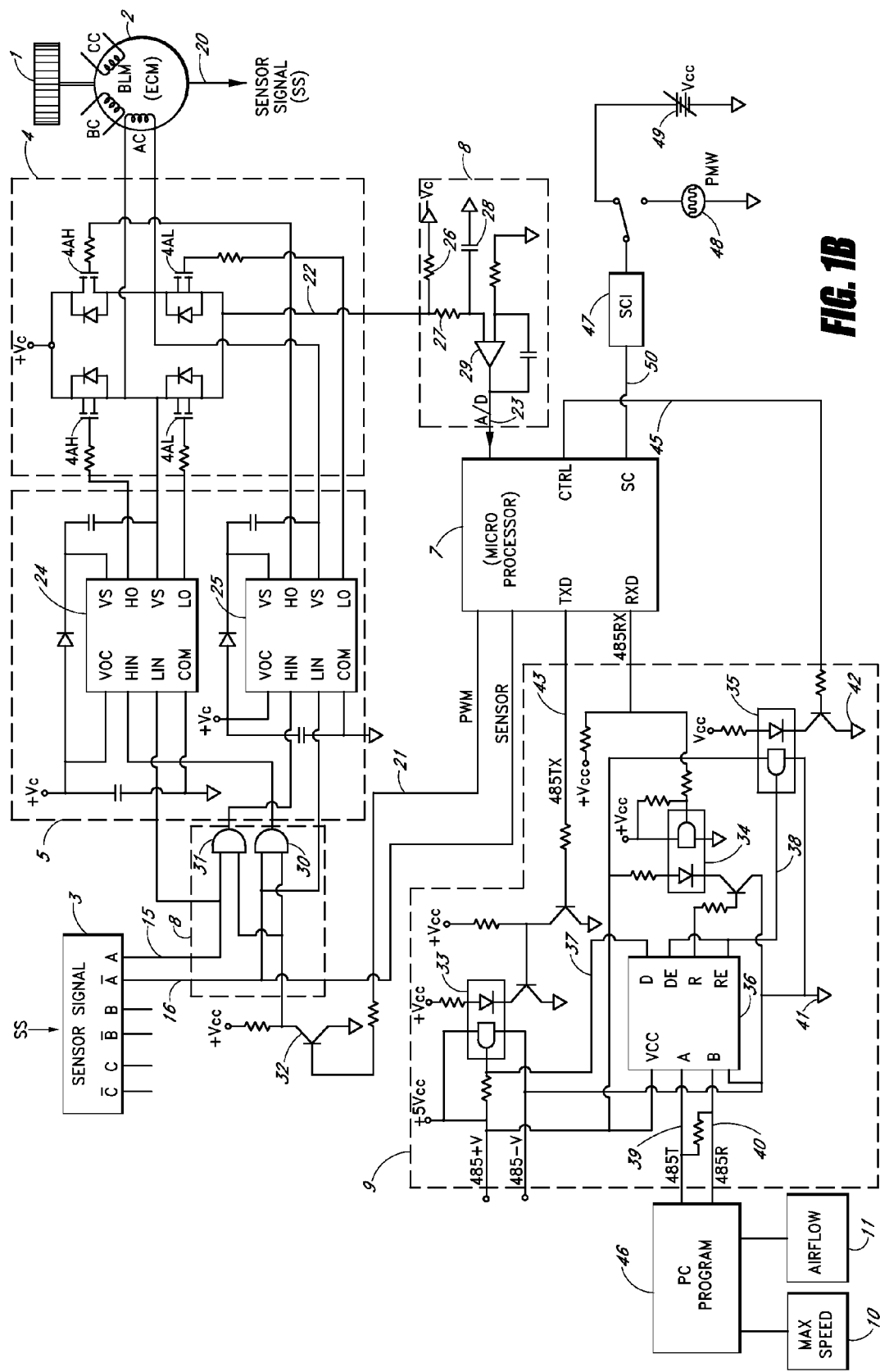
FIG. 1B illustrates of an example circuit diagram of an example embodiment.

FIG. 1B illustrates an example embodiment of the motor controller system of FIG. 1A in greater detail. In the illustrative example embodiment, a variety of fans or blowers of the fan 1 can be connected to the motor 2 in an HVACR system. The motor 2 may include an ECM or BLM of a single-phase, two-phase or three-phase or more. The power switch circuit 4 optionally has full bridge FET elements 4AH, 4AL, 4 H, and 4 L, and is connected to an upper winding of the coil of the motor 2.

Each of gate driving circuit sections 24 and 25 of the gate circuit 5 for driving the FET elements of the power switch circuit 4 may include a gate drive-dedicated circuit such as IRS2106. The gate circuit 5 is connected to the power switch circuit 4 and the logic circuit 6, with logic circuit units 30 and 31 configured for processing the speed signal and the PWM signal.

The power switch circuit 4 is connected to the current detection circuit 8 having a resistor 26 (e.g., with a resistance of about 0.1 to 0.5Ω in the example embodiment), a resistor 27, and a capacitor 28 connected to a motor control circuit ground. A voltage formed across the resistor 26 is integrated when a current flows, and the voltage signal is input to an amplifier 29. The voltage is transmitted to the microprocessor 7 via a line 23. In order to input motor speed (e.g., RPM) information from the rotor position detection processing circuit 3 of the motor 2 (e.g., employing a sensor or back-EMF of an armature coil), the signal is transmitted to the input of the microprocessor 7 via a line 16.

The output of the program input device 46 is connected to a transmission line 39 of an interface, such as of an interface processor 36 (e.g., an RS-485 processor). The output signal is used to control and monitor a maximum speed setting unit 10 and a constant rated airflow setting unit 11, enabling multi-level programming for substantially constant airflow control according to an example embodiment. A transmission output R of the RS486 processor 36 is connected to a data input RXD of the microprocessor 7 through a photo coupler 34. A data output 43 of the microprocessor 7 is connected to a receiving input of the program input device 46 via the photo coupler 33, the RS485 processor 36, and a line 40. A data communication control (CTRL) signal 45 of the microprocessor 7 is connected to a control terminal of the RS485 processor 36 through the photo coupler 35. Accordingly, the program data can be supplied to the microprocessor 7 without unacceptable interference, and grounds 41 and 42 can be electrically insulated from an external program input device 46.

An interface circuit (SCI) 47 has a speed signal conversion microprocessor 56 included therein. The speed signal conversion microprocessor 56 serves to interface a DC variable voltage unit 49 and a pulse width modulator 48 for generating a variable DC voltage of about 0 V to about 10 V and a PWM signal, which is used for speed control or setting, in response to a control signal of an external system controller, to one terminal.

In an example embodiment, the operation of the motor switches from a substantially constant speed mode to a substantially constant torque mode. Operating the motor in constant torque mode provides several advantages in certain HVACR application as compared to operating the motor in constant speed mode in many blower applications. Operating the motor in constant torque mode holds the motor's torque substantially constant despite typical external pressure changes on the blower. This is because, in constant torque mode, the motor speed is adjusted according to the load to maintain a more constant airflow than operating the motor in constant speed mode or PSC-induction motors can provide. For example, when the internal static pressure on the blower changes due to closing/opening registers or filters getting clogged the motor speed will automatically adjust in an attempt to substantially maintain the torque, which may result in better maintenance of the airflow at a desired level. Thus, operating the ECM is constant torque mode will provided improved system performance compared to a PSC-induction motor. However, unlike certain embodiments described herein, conventional ECMs lack the ability to automatically size the torque needed for a desired airflow in a particular installation.

As will be described below, optionally a first table is stored in memory. The first table includes pre-specified speed values, wherein a given RPM speed value corresponds to a respective motor tap. An example table storing a correspondence between a given tap and a corresponding motor speed is depicted below, as Table 1:

TABLE 1

| Tap Number | RPM Rating |
|---|---|
| 5 | 1075 RPM |
| 4 | 975 RPM |
| 3 | 900 RPM |
| 2 | 825 RPM |
| 1 | 600 RPM |

In an example calibration process, a given tap is selected, and the motor is operated in constant speed mode, where the torque may be varied to reach and maintain a desired speed. For example, one or more Hall effect sensors may be used to sense the motor speed. In addition or instead, other techniques may be used to measure motor speed, such as back EMF, wherein the voltage generated by the spinning motor is used to determine the speed of the motor's rotation. By way of further example, a sensor may be used that converts low level DC voltage on the motor coils to torque.

The selected tap may be, for example, the highest tap, or the tap that, based on association of tap and speed, appears to be close to the desired RPM. For example, if a table indicates that tap 1 approximates 1075 RPM, tap 2 approximates 975 RPM, tap 3 is 900 RPM, and the desired RPM is 975 RPM, then tap 2 may be selected for the calibration procedure.

After the motor is operated at the desired speed (e.g., the speed indicated in Table 1 for the tap being calibrated) for a period of time (e.g., after 2 seconds, 2 minutes, or other amount of time), the current/torque needed for that speed is measured. A second table is automatically generated and stored in memory (e.g., by the motor controller system) that associates a torque (e.g., a current or other value corresponding to a given torque) with a respective motor tap. For example, in the second table, an example of which is provided below as Table 2, the measured torque may be associated with the tap selected in performing the calibration. Other taps may be assigned a percentage of the torque measured for the selected tap. For example, the next lower tap may be assigned 80% of the measured torque for the selected tap, which the next higher tap may be assigned 120% of the measured torque for the selected tap (e.g., where the percentage may correspond to the percentage is speed difference for the respective taps relative to the selected tap, as obtained from Table 1). In addition or instead, calibration may be performed at each tap, or a subset of taps, and the corresponding measured torque or current may be then entered into the second table in association with the respective tap.

Thus, the torque, and hence the motor horsepower (as torque×speed=horsepower) is sized for the blower with which the motor is being used. This feature is particularly advantageous in applications involving replacing a legacy motor in an HVACR system, such as a PSC motor or a shaded pole motor, where the installer does not know what torque is needed for that application. In particular, certain embodiments provide a substantially automatic, accurate method of adjusting the torque/horsepower of the motor, without requiring a great deal of installer training or manual intervention is adjusting the torque/horsepower.

Another example embodiment may perform calibration by storing in memory a target speed for a respective tap (e.g., the highest speed tap, the lowest speed tap, and/or other speed tap(s)), commanding the motor to go its highest speed (or lowest speed, or a middle speed, as desired), determining the actual motor speed (e.g., the RPM via Hall sensors, back-EMF, or otherwise), and comparing the actual motor speed with the target speed. If the actual motor speed is within a specified tolerance range of the target speed (e.g., within 1%, 2%, 3% or other specified tolerance range), then the corresponding torque (or respective drive current) is stored in association with an identifier for the tap. If the actual motor speed is not equal to the target speed (e.g., the actual speed is determined to be higher than the target speed), the controller can step down the commanded speed (e.g., by 10%, 5%, 2%, or other percentage/amount), and check again on the actual motor speed. This process can be repeated until the actual speed is within the specified tolerance of the target speed. Further, the process can be repeated for multiple or all of the motor taps in any order.

Figure 2:
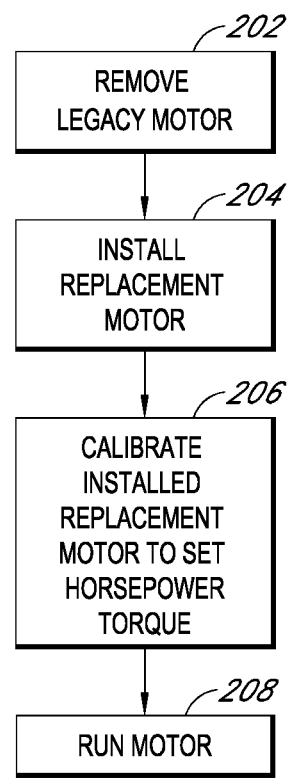
FIG. 2 illustrates an example motor replacement process.

An example motor replacement process will now be described with reference to FIG. 2. At state 202, the installer removes an existing motor from an HVACR system. At state 204, the installer installs a replacement motor in place of the existing motor. At state 206, the installer runs the calibration process on the installed replacement motor to set the motor to the appropriate horsepower/torque for the application. At state 208, the motor is run normally, now with the appropriate horsepower/torque, in a constant torque mode.

In an illustrative embodiment, the autosizing ECM can replace a typical 6 pole PSC motors with rated speed between 1020 RPM (revolutions per minute) and 1075 RPM and rated horsepower between ⅕ HP and 1 HP, such as may be used with forward curved centrifugal blower wheels, backward inclined centrifugal blower wheels, propeller fans, etc. In such an example embodiment, the auto sizing ECM can, by way of illustration, operate a forward curved centrifugal blower wheel in a range of about 600 RPM to 1075 RPM for a typical HVACR load. Of course, other embodiments may provide different rated speeds and ranges of horsepower (e.g., ⅕ HP to ½ HP; ½ HP to 1 HP; 1 HP –2 HP; or other ranges of horsepower), and may be used in different applications, including non-replacement motor applications and applications other than HVACR applications.

Figure 3:
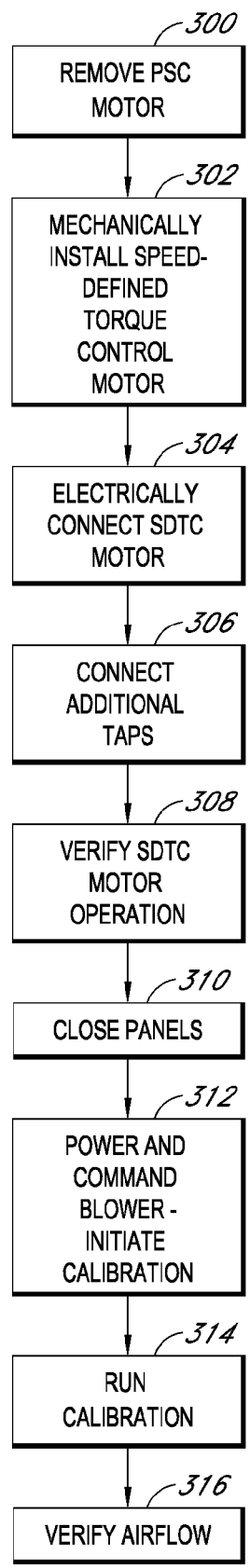
FIG. 3 illustrates an example calibration process.

An example speed-defined torque control calibration procedure will now be described in greater detail with respect to FIG. 3. The illustrated example calibration process causes the motor to scale its torque to an Adjusted Rated Torque (ART)—that is, the torque needed to maintain the rated speed designated for a given speed tap. The calibration process optionally assigns torque values to other taps based on a percentage of the Adjusted Rated Torque.

For purposes of illustration and not limitation, the example calibration procedure assumes a motor with 5 taps, with tap 5 being the highest speed tap (that is, tap 5 causes the motor to spin at the highest RPM which results to the highest airflow relative to taps 1-4, when energized). In such an embodiment, tap 5 provides a high airflow, tap 4 provides a medium high air flow, tap 3 provides a medium airflow, tap 2 provides a medium low airflow, and tap 1 provides a low airflow. One of ordinary skill in the art will recognize that motors with more that 5 taps or less than 5 taps can also be used. One of ordinary skill will also recognize that the calibration procedure does not require use of the highest speed tap and can be configured for other speed taps.

At state 300, an existing motor is optionally removed. For example, the existing motor may be a PSC motor.

At state 302, the speed-defined torque control motor is installed (e.g., as part of a blower system including a blower cabinet with one or more doors/panel). For example, the speed-defined torque control motor may be selected so as to be sized to accommodate a specified range of air flow (e.g., 1020-1075 RPM) and/or horsepower (e.g., ⅕-½ HP).

Figure 4:
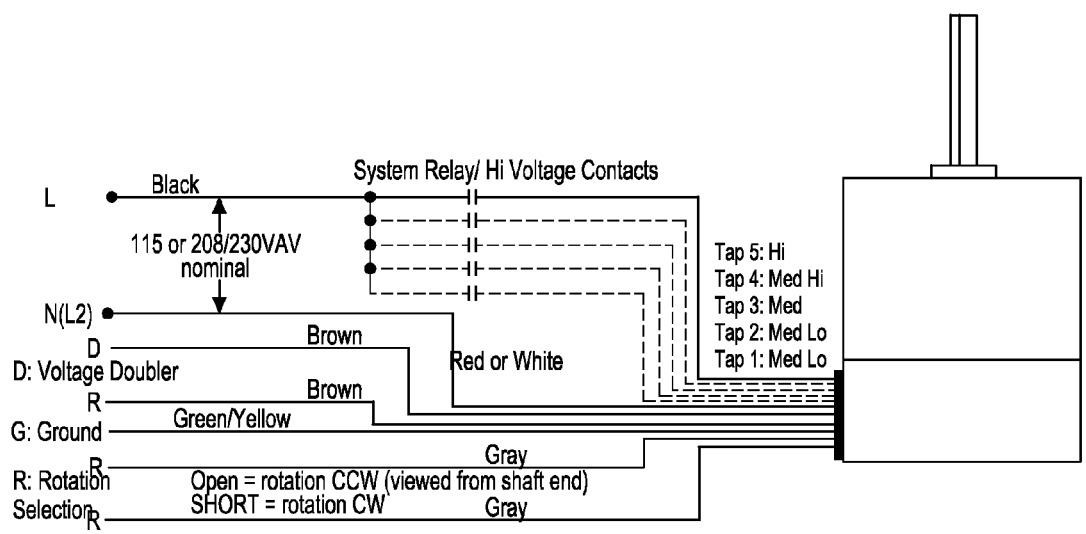
FIG. 4 illustrates an example wiring diagram.

At state 304, the motor is electrically connected to the appropriate power, ground, and other lines. FIG. 4 illustrates an example wiring diagram of an example embodiment of the motor. In the illustrated embodiment, neutral or Line 2 is connected to terminal N (neutral), ground is connected to terminal G (ground), and the AC line (e.g., that may previously been used to power the highest speed setting of a PSC motor being replaced) is connected to the highest tap (tap 5 in this example) of the ECM. For example, the AC line may be connected to 115 VAC or 220 VAC, depending on the installation (as opposed to requiring 24 VAC, thereby further simplifying the replacement of a PSC motor, which generally do not use 24 VAC, although other embodiments may utilize 24 VAC to power the taps). For example, if the ECM is being used to replace a PSC motor, and the PSC motor was configured to use 115 VAC, then the ECM may be similarly configured to use 115 VAC. If the ECM is being used to replace a PSC motor, and the PSC motor was configured to use 220 VAC, then the ECM may be similarly configured to use 220 VAC. If it is desired to operate the motor using 115 VAC, then, in the example embodiment, a jumper is used to connect the D terminals.

The example motor is a dual rotation motor that can rotate either clockwise or counter-clockwise. In this example, the default rotation is counter-clockwise. If a jumper is connected between the two R terminals, the motor will rotate clockwise. The thermostat is also connected.

Optionally, at state 306, if there are additional AC lines connected to speed taps (e.g., lower speed taps 1 through 4) on the legacy PSC motor, these lines may optionally be connected to one or more of the remaining four taps of the ECM using the example tap setting table below (Table 2) to get an initial estimate that corresponds to the PSC motor. In certain optional embodiments, no additional wiring is required relative to the wiring utilized for the PSC motor. Optionally, should multiple taps being simultaneously activated, the highest number activated tap (corresponding to the highest RPM rating of the activated taps) will be given priority over lower number taps (corresponding to lower RPM ratings of the activated taps).

Optionally, at state 308, to verify operation of the motor before closing the doors and/or access panels on the blower, the motor may be operated for an initial period (e.g., 30 seconds or less, 2 minutes, or other time period) prior to beginning the calibration process. Optionally, the motor is turned off prior to the expiration of the initial period (e.g., 5 second prior to the expiration) so that the calibration process does not initiate and to allow the blower doors and panels to be sealed.

At state 310, the blower doors and panels are put in place and closed prior to operating the blower during calibration. Preferably, prior to calibration, the filters through which the motor will be causing airflow are new or cleaned, and the registers through which the motor will blow air are open. Optionally, the system compressor, if one is present, may be turned off to avoid operating the compressor under abnormal airflow conditions.

At state 312, with the motor now properly connected and the blower cabinet secured, the motor is powered and commanded to provide blower output (e.g., by the installer setting the thermostat to command the highest system airflow, which may be the highest cooling stage operation, which in turn will cause the controller to cause power to be applied to the tap being calibrated). Thus, the calibration process may be performed under the same or very similar condition where the motor is operated for ventilation. The results from the calibration process will thus reflect the conditions of the actual ventilation system, such as the size, the design and the weight of the fan, and the configuration of the ventilation system ducting.

The calibration process is optionally initiated without the user having to activate any specific calibration control other than setting of the thermostat. In the case of an HVACR system that includes air conditioning, this setting may be set to command the highest cooling airflow (e.g., by the thermostat activating the Y/Y2 signal, which represents a call for high cooling). In the case of a heating system without air conditioning/cooling, the thermostat may be set to the highest heat setting (e.g., which causes the thermostat to activate the W/W2 signal).

At state 314, the blower/motor is run at the setting of state 312 for a desired calibration period of time (e.g., 2 seconds, 30 seconds, 60 seconds, 120 seconds, etc.) to complete the calibration process. Optionally, if a problem develops or it is determined that the initial calibration setup is incorrect, the calibration process can be prematurely terminated by turning off power to the motor within a certain period of time (e.g., 30 seconds) after initially turning on power to the motor for the calibration procedure.

As similarly discussed above, HVACR manufacturers conventionally design products for a specific static pressure (rated static pressure) and RPM of the motor. Manufacturers test their product for a range of static pressure so the unit will safely operate in high static installations. However, when the motor is installed in a home or commercial building, the static pressure is often higher than the rated static pressure. In a high static installation, a PSC or shaded pole motor (AC motor) changes performance or speed output due to the increased load. This can cause the motor to operate at an RPM different than its optimal design point. Using SDTC, the motor substantially matches its RPM to the RPM represented by the speed tap being selected (which may correspond to the rated RPM of the motor being replaced). This could restore the HVACR equipment's performance by delivering the airflow originally intended by the manufacturer. The motor accomplished this by automatically increasing the torque output of the motor to maintain the speed to the rated speed of the tap.

In the example embodiment, the motor starts in Constant Speed mode (CS) or Regulated Speed mode (RS) in which the speed is controlled to the commanded level. As discussed above, the motor has several different "speed taps" or "torque taps" which corresponds to a desired or rated RPM level. This RPM level may be preset, may be programmed by the user, or adjusted via a control (e.g., a dial, a switch, a button, a touch screen user interface, a control panel, etc.) in the field.

The user commands a selected one of the speed taps to activate the motor. For example, the motor may be powered and commanded though the selected tap, or the motor may be powered via the selected tap and commanded via a digital port, a low voltage tap, other tap, or other interface. The motor responds to the command by ramping up to the commanded speed. In the RS mode, the motor automatically produces enough torque to hold the commanded speed constant. After a predetermined initial period of time, the motor enters a calibration process in which the calibration process determines the current being used (e.g., my measuring the coil load current via the current detection circuit 8 illustrated in FIG. 1A) to hold the motor speed substantially constant.

The motor then switches automatically to Constant Torque (CT) mode and the calibration process sets the measured current value as the value for the selected tap (e.g., the value corresponding to the current needed to achieve the torque that corresponds to the desired RPM). Optionally, the high speed tap is used so that maximum current is known. Optionally, the values for the remaining taps are automatically set as a percentage of the Application Rated Torque (ART). The ART is the maximum torque value set using the calibration process. As discussed elsewhere herein, the remaining taps may be independently calibrated, but in certain embodiments, to reduce the time, effort, and training needed to perform the calibration, the installer may only calibrate a single tap.

In particular, by only having to calibrate one tap in certain embodiments, the installer simply turns on the unit/motor after installation and waits until the motor has run through the calibration process.

After the calibration period, the calibration process is completed and the motor is ready to operate normally. In this example, at the calibration process completion, tap 5 represents the torque (e.g., the Adjusted Rated Torque (ART)) used to operate the blower to achieve 1075 RPM, and the lower taps (taps 1-4 in this example) are scaled per Table 2 below based on the calibrated torque (the ART) of tap 5. A calibration flag is optionally set and stored in memory by the controller, indicating that calibration has been performed. The next time the thermostat provides a command to apply power to the calibrated tap, the flag will be read from memory by the controller, and the controller will not reinitiate the calibration procedure for the tap.

At state 316, the airflow is optionally measured (e.g., using a Pitot tube, an anemometer, using the ratio of the HVACR heat exchanger entering air temperature/heat exchanger leaving air temperature, or other airflow measurement device or technique). If the system performance measurements indicate that the airflow if outside of acceptable levels (e.g., as determined by comparing the measured airflow against a specified airflow, such as the manufacturer's specified tolerance), then a process used to address failures to properly calibrate may be employed, as described in greater detail below. Optionally, the installer can activate a reset control, the calibration flag, if any, may be cleared, and the calibration procedure is repeated. In an example optional embodiment, the reset control does not utilize any additional physical interfaces beyond the normal motor wiring. For example, the reset of tables 2 and 3 (to replace the values stored by the previous calibration process) may be initiated by connected taps 3 and 4 (e.g., using a jumper), applying power to taps 3 and 4 simultaneously (e.g., by applying power via the jumper) for a certain time period (e.g., 7 seconds after the motor begins to run). Other embodiments may use a dedicated reset control, a command received over a digital data interface (e.g., a serial, parallel, or wireless interface), or other technique or interface to initiate the reset. When the motor stops, the reset of the previous values has occurred.

If the system performance measurements indicate that the airflow is higher than a specified desired level (e.g., as determined using the airflow measurements and/or other system performance parameters (e.g., such as the ratio of the heat exchanger entering air temperature/heat exchanger leaving air temperature)), then the tap settings are adjusted to the lower taps to achieve the desired airflow. In an example embodiment, the taps are spaced as indicated in Table 2 below, although other taps spacings may be used. In multiple speed systems, more than one tap may need adjustment depending of the airflow measurements and/or on other parameters.

Example Tap Settings Spacing (of Adjusted Rated Torque-ART)

TABLE 2

| Tap Number | % of Adjusted Rated Torque-ART |
|---|---|
| 5 | 100% |
| 4 | 91% |
| 3 | 84% |
| 2 | 77% |
| 1 | 55% |

An example processes employed upon the failure to properly calibrate the motor will now be described. In this example, the failure to calibrate the motor indicates that the motor was unable to output the torque needed to reach the desired speed within a specified range (e.g., 1075 RPM (+/− 50 RPM)) in the given blower. This generally indicates that the motor being replaced has more torque production capability than the installed ECM being used to replace it. If this situation occurs, then a higher horsepower ECM can be used to provide the desired speed.

In the example embodiment, if the motor is unable to reach rated speed (e.g., 1075 RPM (+/−50 RPM)), the motor sets a group of default torque settings (which may use the rated torque for the highest tap, and scale the other taps accordingly), an example of which is depicted as Table 3, which are stored in memory below.

Example of Default Torque Settings Tap 5-100% of Rated Torque

TABLE 3

| Tap Number | % of Rated Torque-ART |
|---|---|
| 5 | 100% |
| 4 | 91% |
| 3 | 84% |
| 2 | 77% |
| 1 | 55% |

In some situations, the failure to properly calibrate the motor may be caused by airflow problems (e.g., blockages in the HVACR duct or a clogged filter). In such circumstances, airflow measurement may be performed using an airflow meter to verify acceptable airflow and system performance. The airflow problems may be corrected (e.g., by removing blockages in the HVACR duct or replacing a clogged filter) and the motor recalibrated using the process described above.

Thus, the automatic horsepower sizing calibration process/ speed-defined torque control enables the motor to automatically size its horsepower. This process allows a motor of a certain horsepower to be installed, by way of example, in a furnace or air handler which needs the same horsepower motor or a lower horsepower motor and sizes itself to the load needs of that application. This enables one motor configuration to be used for multiple horsepower applications thus saving energy, reducing part numbers and/or reducing inventory costs, and simplifies installation for the installer as compared to conventional ECMs. Such an auto-sizing motor can also reduce the number of motors and motor configurations a contractor or distributor needs to carry because a single motor configuration with speed-defined torque control can replace multiple PSC motors of different horsepower. Having such an autosizing motor will make it significantly more likely that a contractor will have an appropriate motor that meets the need of a given HVACR installation, are thus reduces the likelihood that the contractor will need to leave the job site to get a properly sized motor.

Advantageously, a speed-defined torque control motor is also beneficial to contractors because the installation of a speed-defined torque control motor can be very similar to the installation of PSC motor and often does not require rewiring of the HVACR system. For example, in certain embodiments, the contractor/installer simply connects power to the speed taps and turns the motor on in the same or similar manner as with a PSC motor. Thus, the ECM motor may be a drop-in replacement for a PSC-induction motor. The speed-defined torque control motor then automatically goes through the calibration process, without the installer having to take any action during the calibration process.

In contrast, conventional ECMs require a significant amount of user manual manipulation of wiring to select different operating levels so that one HP size can be used for multiple applications. Certain other conventional ECMs have fixed output taps and require a motor having a fixed horsepower corresponding to the one being replaced.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Implementations are included within the scope of the embodiments described herein which elements or functions which may be deleted, depending on the functionality involved, as would be understood by those skilled in the art.

Although this invention has been described in terms of certain preferred embodiments, other embodiments that are apparent to those of ordinary skill in the art, including embodiments that do not provide all of the features and advantages set forth herein, are also within the scope of this invention.

What is claimed is:

1. An electronically commutated motor, comprising:
   one or more electromagnets; and
   a controller device to control the electromagnets, the controller device configured to calibrate operation of the motor in a desired installation by:
   causing the electronically commutated motor to ramp up to a first desired speed;
   monitoring the electronically commutated motor to determine if it has reached the first desired speed;
   measuring an electric current needed to operate the electronically commutated motor at the first desired speed, wherein the electric current corresponds to a torque needed to maintain the electronically commutated motor at the first desired speed in the desired installation; and
   setting a value corresponding to a first speed tap using the measured electric current,
   wherein the controller device is configured to operate the electronically commutated motor in a substantially constant torque mode using the set value at least after the completion of the calibration operation.

2. The electronically commutated motor as defined in claim 1,
   wherein the electronically commutated motor is operated in a constant speed mode when the electric current needed to operate the electronically commutated motor at the first desired speed is measured, and
   wherein the controller device is configured to subsequently operate the electronically commutated motor in the constant torque mode using the set value.

3. The electronically commutated motor as defined in claim 1, wherein the first speed tap is the only speed tap of the electronically commutated motor to which power is applied during the calibration operation, and
   wherein the controller device is further configured to set a value for a second speed tap as a percentage of an application rated torque associated with the first speed tap.

4. The electronically commutated motor as defined in claim 1, wherein the electronically commutated motor has a rated maximum horsepower and wherein the controller device is configured to operate the electronically commutated motor at less than the rated maximum horsepower based at least in part on the measured electric current.

5. The electronically commutated motor as defined in claim 1, wherein the electronically commutated motor has a rated maximum torque and wherein the controller device is configured to operate the electronically commutated motor at less than the rated maximum torque based at least in part on the measured electric current.

6. The electronically commutated motor as defined in claim 1, wherein the controller device is configured to initiate the calibration at least partly in response to a command being received from a thermostat, wherein the electronically commutated motor does not have a separate physical control for initiating calibration.

7. The electronically commutated motor as defined in claim 1, wherein the controller device is configured to initiate the calibration by applying power to the first speed tap.

8. The electronically commutated motor as defined in claim 1, wherein the electronically commutated motor is configured to be installed in a ventilation system to cause airflow.

9. The electronically commutated motor as defined in claim 1, wherein the electronically commutated motor is configured to be a drop-in replacement for a permanent-split capacitor motor.

10. A method sizing a motor torque, comprising:
    installing a first motor having a first speed tap;
    applying power to the first speed tap;
    causing the first motor to ramp up to a first commanded speed and a calibration process to be initiated, the calibration process comprising:
    causing sufficient motor torque to be produced to hold the first commanded speed substantially constant for a first period of time;

determining a value corresponding to a torque needed to hold the first motor substantially constant at the first commanded speed;

storing the value corresponding to the torque needed to hold the first motor substantially constant at the first commanded speed; and operating the first motor in a constant torque mode based upon the stored value.

11. The method as defined in claim 10, wherein the value corresponding to the torque needed to hold the speed substantially constant corresponds to a current used to drive a coil of the first motor when holding the first motor substantially constant at the commanded speed.

12. The method as defined in claim 11, the method further comprising:

setting the value as the value for the first speed tap of the first motor;

setting a value for a second speed tap of the first motor based at least on the value for the first speed tap, the value for the second speed tap corresponding to a current needed to hold the first motor substantially constant at a second speed.

13. The method as defined in claim 10, wherein the calibration process is initiated in response to a thermostat setting.

14. The method as defined in claim 10, the method further comprising removing a second motor prior to installing the first motor, wherein the first motor is used to replace the second motor, and wherein the first motor is an electronically commutated motor and the second motor is a permanent-split capacitor motor, wherein installing the first motor further comprises connecting all wiring previously connected to terminals of the second motor to the first motor.

15. The method as defined in claim 10, the method further comprising resetting the value by applying a voltage to at least two speed taps of the first motor at the same time.

16. The method as defined in claim 10, wherein the first speed tap is a highest speed tap of the first motor, wherein the first motor includes a plurality of speed taps.

17. The method as defined in claim 10, wherein the first motor is installed in a ventilation system.

18. The method as defined in claim 10, wherein a user takes no manual action with respect to the calibration process during the calibration process.

19. A controller configured to control operation of a motor, the controller comprising:

a computing device:

non-transitory memory that stores program instructions, that when executed by the computing device are configured to perform operations comprising:

calibrating the motor for a given installation by:

at least partly causing the motor to operate at a first desired speed;

determining a value corresponding to a torque needed to operate the motor at the first desired speed;

storing the value corresponding to the torque needed to operate the motor at the first desired speed in association with a first speed tap of the motor; and at least after completion of the calibration, operating the motor in a substantially constant torque mode using the stored value.

20. The controller as defined in claim 19, the operations further comprising measuring an electric current corresponding to the torque needed to operate the motor at the first desired speed, wherein the determined value is determined based at least in part on the measured electric current.

21. The controller as defined in claim 20, wherein the motor is operated in a constant speed mode when the electric current corresponding to the torque needed to operate the motor at the first desired speed is measured, and wherein the controller is configured to subsequently operate the motor in the constant torque mode using the stored value.

22. The controller as defined in claim 19, wherein the controller is further configured to set a value for a second speed tap by scaling an application rated torque associated with the first speed tap.

23. The controller as defined in claim 19, wherein the motor has a rated maximum horsepower and wherein the controller is configured to operate the motor in a range of the rated maximum horsepower to less than the rated maximum horsepower based at least in part on the stored value.

24. The controller as defined in claim 19, wherein the motor has a rated maximum torque and wherein the controller is configured to operate the motor at less than the rated maximum torque based at least in part on the stored value.

25. The controller as defined in claim 19, wherein the controller is configured to initiate the calibration at least partly in response to a command being received from a thermostat, wherein the motor does not have a separate physical control for initiating calibration.

26. The controller as defined in claim 19, wherein the controller is configured to initiate the calibration by applying power to the first speed tap.

27. The controller as defined in claim 19, wherein the controller is integral to the motor.

28. The controller as defined in claim 19, wherein the motor is an electronically commutated motor.

* * * * *